United States Patent
Eichenberger et al.

(10) Patent No.: US 8,341,615 B2
(45) Date of Patent: Dec. 25, 2012

(54) SINGLE INSTRUCTION MULTIPLE DATA (SIMD) CODE GENERATION FOR PARALLEL LOOPS USING VERSIONING AND SCHEDULING

(75) Inventors: Alexandre E. Eichenberger, Chappaqua, NY (US); Raul E. Silvera, Woodbridge (CA); Amy K. Wang, North York (CA); Guansong Zhang, Markham (CA)

(73) Assignee: International Business Machines Corporation, Armonk, NY (US)

( * ) Notice: Subject to any disclaimer, the term of this patent is extended or adjusted under 35 U.S.C. 154(b) by 1201 days.

(21) Appl. No.: 12/172,199

(22) Filed: Jul. 11, 2008

(65) Prior Publication Data

US 2010/0011339 A1  Jan. 14, 2010

(51) Int. Cl.
*G06F 9/45* (2006.01)
*G06F 9/46* (2006.01)

(52) U.S. Cl. ....................... 717/161; 718/107

(58) Field of Classification Search ........... 717/106–161
See application file for complete search history.

(56) References Cited

U.S. PATENT DOCUMENTS

| | | | | |
|---|---|---|---|---|
| 5,930,510 A | * | 7/1999 | Beylin et al. | 717/161 |
| 6,651,246 B1 | * | 11/2003 | Archambault et al. | 717/160 |
| 6,748,020 B1 | * | 6/2004 | Eifrig et al. | 375/240.26 |
| 7,263,689 B1 | * | 8/2007 | Edwards et al. | 717/127 |
| 7,302,557 B1 | * | 11/2007 | Hwu et al. | 712/241 |
| 7,814,486 B2 | * | 10/2010 | Papakipos et al. | 718/100 |
| 8,024,708 B2 | * | 9/2011 | Demetriou et al. | 717/124 |
| 8,037,465 B2 | * | 10/2011 | Tian et al. | 717/158 |
| 2007/0220525 A1 | * | 9/2007 | State et al. | 718/107 |
| 2009/0125882 A1 | * | 5/2009 | Frigo et al. | 717/116 |
| 2010/0274549 A1 | * | 10/2010 | Tal et al. | 703/17 |

* cited by examiner

*Primary Examiner* — Don Wong
*Assistant Examiner* — Mohammad Kabir
(74) *Attorney, Agent, or Firm* — Steven M. Greenberg, Esq.; Carey, Rodriguez, Greenberg & O'Keefe

(57) ABSTRACT

Embodiments of the present invention address deficiencies of the art in respect to loop parallelization for a target architecture implementing a shared memory model and provide a novel and non-obvious method, system and computer program product for SIMD code generation for parallel loops using versioning and scheduling. In an embodiment of the invention, within a code compilation data processing system a parallel SIMD loop code generation method can include identifying a loop in a representation of source code as a parallel loop candidate, either through a user directive or through auto-parallelization. The method also can include selecting a trip count condition responsive to a scheduling policy set for the code compilation data processing system and also on a minimal simdizable threshold, determining a trip count and an alignment constraint for the selected loop, and generating a version of a parallel loop in the source code according to the alignment constraint and a comparison of the trip count to the trip count condition.

13 Claims, 2 Drawing Sheets

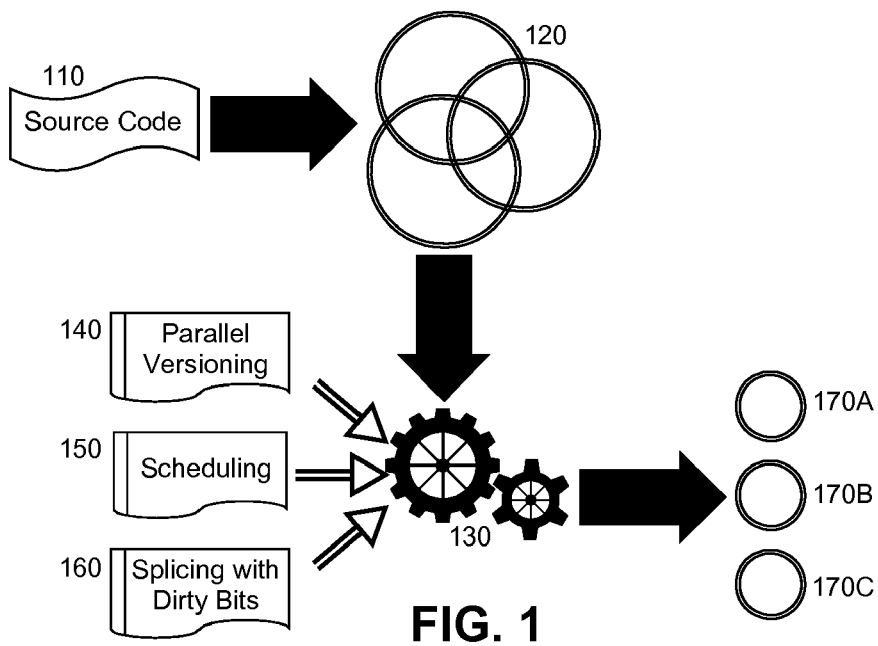
FIG. 1
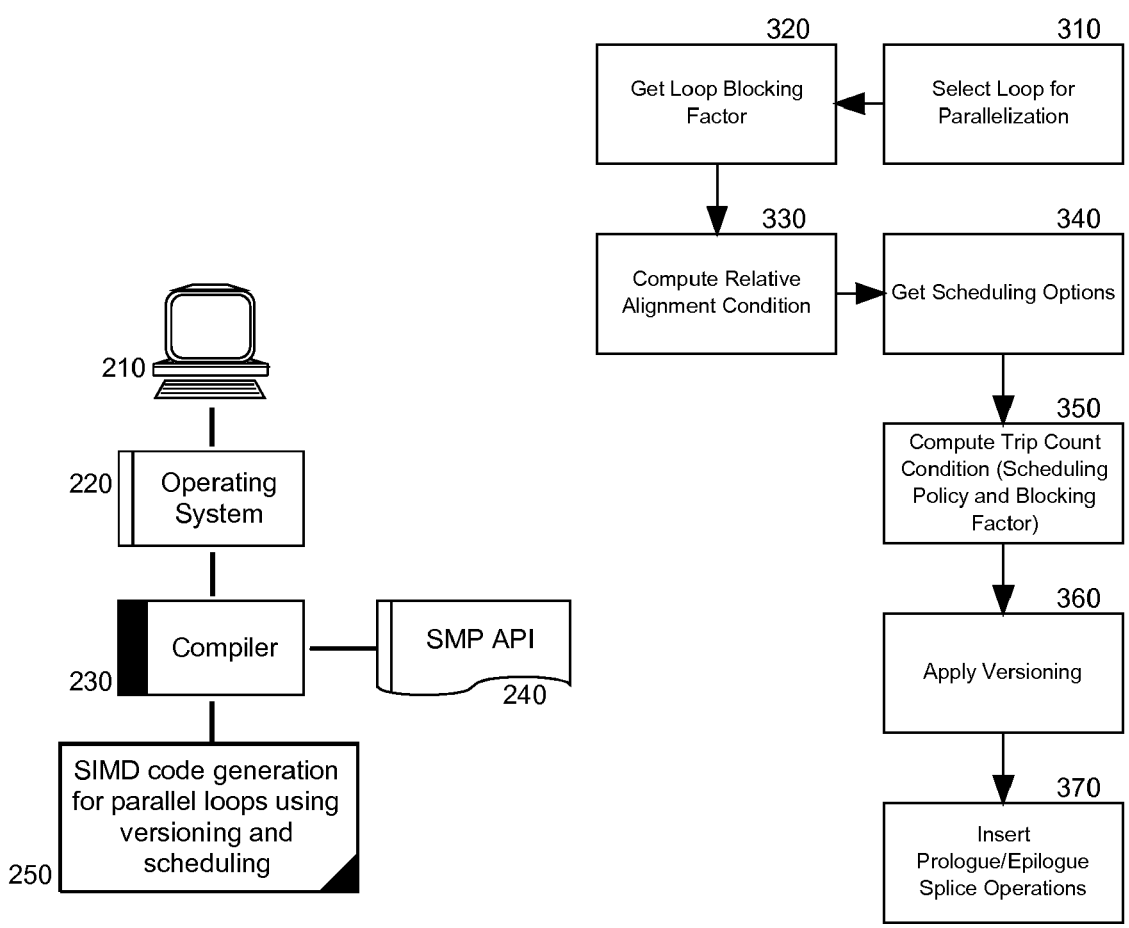
FIG. 2
FIG. 3

SINGLE INSTRUCTION MULTIPLE DATA (SIMD) CODE GENERATION FOR PARALLEL LOOPS USING VERSIONING AND SCHEDULING

BACKGROUND OF THE INVENTION

1. Field of the Invention

The present invention relates to the field of workload partitioning in a parallel system with processing units having alignment constraints and more particularly to parallelizing loops for execution in a target computing architecture implementing a shared memory model.

2. Description of the Related Art

Workload partitioning focuses on distributing work known to be parallel among the multiple processing elements of a computing system. Processing elements can include threads executing on a single processor, multiple processors in a single core, multiple processors in different cores, or any combination thereof. When partitioning work amongst processing elements, maximum job size, load balancing, and latency hiding reflect primary considerations.

In this regard, when a memory subsystem is known to function optimally with a given working set size, the partitioning algorithm of the memory subsystem will chunk work in subsets of units, each of which has a working set size smaller or equal to the given working set size. Also, with respect to load balancing, a typical partition algorithm attempts to partition work amongst different processing elements as evenly as possible. Finally, with respect to latency hiding, a typical partition algorithm aims to split work into smaller chunks than an established maximum working set size so that several tasks may be "in flight" concurrently for a given set of processing elements.

Workload partitioning is generally well understood for homogenous systems where all the processing elements have similar characteristics. For heterogeneous systems, however, workload partitioning is less well understood. Specifically, in the context of heterogeneous systems, Cell Broadband Engine (CBE) technologies have introduced a new class of processing element demonstrating a new set of heterogeneous constraints. These constraints can significantly impact overall system performance when not taken into account while partitioning work amongst the processing elements of the CBE.

As it is well-known, CBE is a heterogeneous multicore processor chip that incorporates Synergistic Processor Elements (SPEs) as high-performance processing cores and a PowerPC Processor Element (PPE) as a general-purpose processor core, connected to a high-speed input/output (I/O) and a high-speed memory system by a high-bandwidth internal bus referred to as the Element Interconnect Bus (EIB). Of note, the CBE enjoys a scalable architecture that is optimized for parallel and distributed broadband computing environments.

The SPE processing units of the CBE incorporate a SIMD architecture with alignment constraints. That is, when a SIMD memory operation is performed in the SPE, the lower four bits of the address are silently discarded and the SIMD units load and store sixteen bytes of data to the truncated address. The silent discarding of the lower four bits of the address has significant consequences when parallelizing code among SIMD-only SPEs, as this truncating of address and mandatory sixteen-byte reading and writing of memory can generate false sharing conditions at the boundaries of tasks between two SPEs. More precisely, unless properly taken care of, each SPE must take additional steps to track which value within a sixteen byte boundary is written so that, when a particular SPE is only responsible for generating a subset of these sixteen bytes, it does not accidentally overwrite the values for which the particular SPE is not responsible.

To adapt program code for operation in connection with a CBE, a process of SIMD vectorization must be applied to the program code at compile time. SIMD vectorization, also known as "simdization", is an algorithm implemented within the compiler producing code for the CBE. Successful simdization involves several tasks that closely interact with each other. First SIMD parallelism must be extracted from program code, which may involve extraction from a basic-block, a loop, or a combination of both. Once that parallelism is extracted, various additional SIMD hardware constraints must be satisfied, such as memory alignment requirements, physical vector length, and hardware instruction set.

The alignment constraint of SIMD memory units is a hardware feature that can significantly impact the effectiveness of the simdization of a computing architecture. For example, memory operations in one popular type of SIMD memory unit can only access sixteen-byte contiguous memory from sixteen-byte aligned addresses. As such, in order to satisfy alignment constraints imposed by the hardware, the data reorganization codes must be inserted to explicitly realign data during the simdization process. Additional alignment handling overhead may be added if alignments of some memory accesses in the codes are only known at runtime. It is to be recognized, however, that the code overhead associated with simdization can impose a severe performance impact when the chunk size is not carefully chosen, thus causing additional alignment handling overhead.

BRIEF SUMMARY OF THE INVENTION

Embodiments of the present invention address deficiencies of the art in respect to loop parallelization for a target architecture implementing a shared memory model and provide a novel and non-obvious method, system and computer program product for SIMD code generation for parallel loops using versioning and scheduling. In an embodiment of the invention, within a code compilation data processing system a parallel SIMD loop code generation method can include identifying a loop in a representation of source code as a parallel loop candidate, either through a user directive or through auto-parallelization. The method also can include selecting a trip count condition responsive to a scheduling policy set for the code compilation data processing system and also on a minimal simdizable threshold, determining an alignment constraint for the selected loop, and generating versions of a parallel loop in the source code according to the alignment constraint and a comparison of the trip count to the trip count condition.

In one aspect of the embodiment, the method also can include inserting a prologue splicing operation and an epilogue splicing operation before and after a simdized body of a version of the parallel loop to provide dirty bit information in connection with the prologue and epilogue splicing operations. In this regard, a dirty bit as it is commonly understood in connection with multiple processors operating jointly on common work in global memory, is binary information that tracks whether a specific unit of memory has been modified by a local process so that when copying data to global memory, only data associated with a dirty bit will be transcribed into the global memory.

In another aspect of the embodiment, selecting the trip count condition can include selecting a trip count condition based upon a scheduling scheme for a target symmetric multiprocessor (SMP) application programming interface (API). In yet another aspect of the embodiment, generating a version of a parallel loop in the source code according to the SIMD relative alignment constraint and a comparison of the trip count to the trip count condition can include generating a first version when the trip count for the selected loop is below a minimum threshold set by the trip count condition, generating a second version when only compile time shifts are required to manage alignment (fast SIMD version due to compile time shifting), and generating a third version when both compile time and runtime shifts are required to manage alignment (slow SIMD version due to compile time and runtime shifting).

In another embodiment of the invention, a code compilation data processing system can be provided. The system can include a host computing platform supporting an operating system managing a compiler executing in the operating system. The system also can include a shared memory application programming interface (API), such as the Open MP standard provided for the compiler. Finally, the system can include SIMD code generation logic coupled to the compiler and accessing the shared memory API. The logic can include program code enabled to generate one of three versions of a parallel loop for a candidate loop from user specified directives or from an automated compiler identification of the parallel loop, according to a computed alignment condition and a comparison of a trip count determined for the loop with a specified trip count condition.

Notably, the shared memory API can include at least a splice sequence of machine instructions that splice together bytes of data into one addressable sequence of data and further that communicates dirty bit information to a cache for a corresponding SPE when executed to overcome the requirement that the architecture must adhere to a shared memory consistency model and, as such, to avoid false sharing conditions which otherwise require the inefficient compution of the prologue/epilogue elements in a scalar fashion. Further, the specified trip count condition can be variable according to a scheduling policy established for the compiler and a simdizable trip count threshold.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a pictorial illustration of a process for SIMD code generation for parallel loops using versioning and scheduling;

FIG. 2 is a schematic illustration of a code compilation data processing system configured for SIMD code generation for parallel loops using versioning and scheduling;

FIG. 3 is a flow chart illustrating a process for SIMD code generation for parallel loops using versioning and scheduling; and, FIG. 4 is a pictorial illustration of code snippets representative of a process for SIMD code generation for parallel loops using versioning and scheduling.

DETAILED DESCRIPTION OF THE INVENTION

Figure 4:
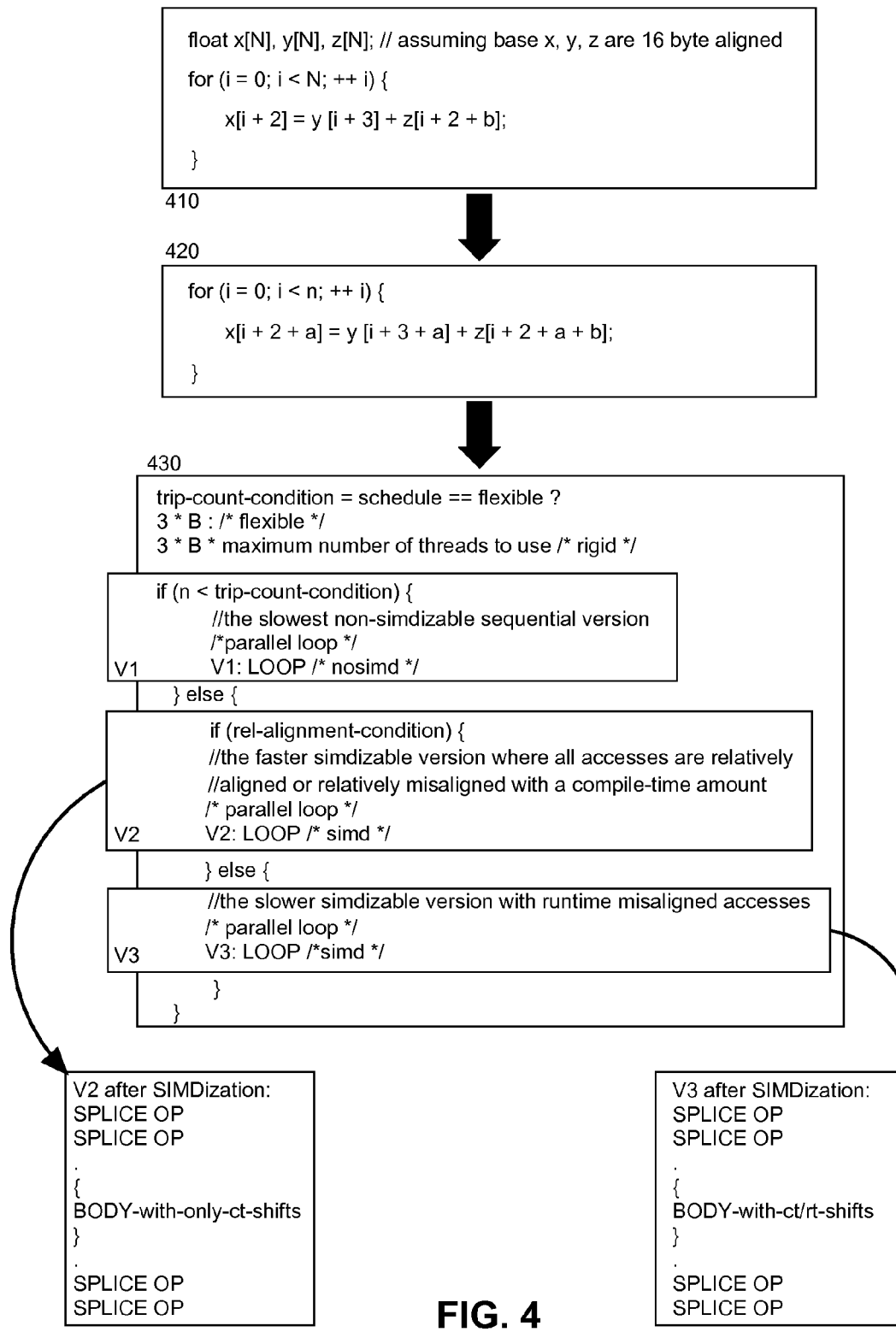

Embodiments of the present invention provide a method, system and computer program product for SIMD code generation for parallel loops using versioning and scheduling. In accordance with an embodiment of the present invention, source code can be compiled for execution in a target architecture implementing a shared memory model using any combination of software and hardware support. During compilation of the source code, a loop can be identified within the source code and modified for parallel execution. Specifically, absolute alignments for memory references can be preserved by partitioning the loop into chunks that are a multiple of the blocking factor of the loop. The loop is versioned into three versions accordingly.

Of note, creating three parallel loops avoids the code bloat introduced by versioning generally. As each parallel loop is outlined into a separate routine, and brought into the SPE on demand via an overlay mechanism of the SPE, simdization happens on each outlined routine. This is uniquely different from having a single parallel loop becoming three versions after simdization and all of which all must fit into one overlay as would be the case in the absence of creating three parallel loops.

A first version can exclude simdization for a loop with a trip count below a minimum trip count condition. A second version can provide for simdization of a loop with only compile time shifts to manage alignment (fast SIMD version due to compile time shifting). A final version can provide for simdization of a loop with both compile time and runtime shifts to manage alignment (slow SIMD version due to compile time shifting and runtime shifting). In addition to versioning, the trip count constraint is enhanced account for the scheduling policy set for the compiler, for example system imposed, rigid scheduling or flexible scheduling. Finally, prologue and epilogue splicing can be directed for the second and third versions, and as part of the splicing dirty bit information can be provided for the benefit of the cache to indicate which bytes have been updated.

In illustration, FIG. 1 pictorially depicts a process for SIMD code generation for parallel loops using versioning and scheduling. As shown in FIG. 1, source code 110 can be examined to identify a parallel loop 120. SIMD code generator 130 can process the loop 120 to produce parallel loops 170A, 170B, 170C by applying each of versioning 140, scheduling 150 and slicing 160. Versioning 140 can provide for different methods of generating the parallel loops 170A, 170B, 170C depending upon whether or not a trip count for the loop 120 is below a minimum threshold set by a trip count condition and the scheduling policy for the compiler or whether only compile time shifts are required to manage alignment, or whether both compile time and runtime shifts are required to manage alignment.

Scheduling 150 in turn refers to a selection of the trip count condition used to select a particular generation of the parallel loops 170A, 170B, 170C. The selection of the trip count condition can vary according to whether or not the compiler has established a flexible or system imposed, rigid scheduling policy for scheduling workloads amongst different processing elements, or whether another a different type of scheduling scheme has been specified. In this regard, flexible scheduling refers to the ability of processing elements to process units of work (chunks of work) as the processing elements become available to process chunks of work at runtime. By comparison, in system imposed, rigid scheduling (like the system imposed, rigid scheduling policy of the OpenMP standard), processing elements process only those chunks of work assigned to the processing elements and that the compiler cannot voluntarily resize the chunks of work at compile time in order to meet simdization constraints or other compiler objectives.

Finally, the splicing 160 refers to the use of prologue and epilogue splice operation in simdizable versions of parallel loop generation to avoid false sharing. Notably, the splicing 160 can provide dirty bit information to a corresponding cache to indicate which bits have been updated to avoid false sharing conditions.

The process shown in FIG. 1 can be implemented in a code compilation data processing system configured for compiling code targeted for an architecture implementing a shared memory model, for example a computing architecture implementing a symmetric multi-processor (SMP) API on a non-uniform memory architecture where each SPE in the architecture has small local storage. In illustration, FIG. 2 is a schematic illustration of a code compilation data processing system configured for SIMD code generation for parallel loops using versioning and scheduling. The system can include a host computing platform 210 supporting an operating system 220 managing the execution of a compiler 230. The compiler 230 can include a shared memory application programming interface (API) 240 supporting the OpenMP standard. Finally, SIMD code generation logic 250 can be coupled to the compiler 230.

The SIMD code generation logic 250 can include program code enabled to generate parallel loops for a loop in a representation of source code according to different versions to avoid code size bloat due to versioning, the versions accounting for whether or not a trip count for the loop is below a minimum SIMD threshold set by a trip count condition and default schedule, whether only compile time shifts are required to manage alignment (fast), or whether both compile time and runtime shifts are required to manage alignment (slow). The program code of the SIMD code generation logic 250 further can be enabled to set the trip count condition differently based upon whether or not the compiler has a flexible or system imposed, rigid scheduling scheme. Yet further, the program code of the SIMD code generation logic 250 can be enabled to apply prologue and epilogue splicing to the loop in order to remediate misalignments, while providing dirty bit information to the cache in order to specify precisely to the cache the bits that have changed in order to avoid a false sharing condition.

In yet further illustration of the operation of the SIMD code generation logic 250, FIG. 3 is a flow chart illustrating a process for SIMD code generation for parallel loops using versioning and scheduling. Beginning in block 310, a loop in a representation of source code can be selected for parallelization. In block 320, a loop blocking factor derived from the number of iterations that can be handled by the processor element concurrently can be determined in that the beginning alignment of an array section of a loop repeats at a number of iterations that are a multiple of the loop blocking factor. Additionally, in block 330, absolute alignment property can be preserved based upon choosing the chunk size as multiple of the loop blocking factor.

In block 340, the scheduling scheme for the compiler can be determined. The scheduling scheme can include by way of example, flexible and system imposed, rigid scheduling. Based upon the determined scheduling scheme, in block 350 a trip count condition can be set, for example for flexible scheduling the trip count condition can be set to at least 3B (three times the blocking factor) or some multiple of 3B in order to induce a simdizable versioning of the loop. (SIMD requires a minimal number of iterations to successfully handle the alignment) In contrast, for system imposed, rigid scheduling, the trip count condition can be set to 3B*a maximum number of threads to be used.

More specifically, for flexible scheduling, the compiler defines the trip count condition such that the first T−1 threads are assigned (n−n % 3B)/T iterations and the last thread is assigned (n−n % 3B)/T+n % 3B iterations. The number of threads T is determined as min(floor(n/3B), the maximum number of threads to be used). By comparison, for system imposed, rigid scheduling and guided scheduling, T is set to the maximum number of threads to be used in order to guarantee that each thread is assigned at least 3B number of iterations, so that the trip count condition becomes 3B*the maximum number of threads to be used. In this way (i.e. having at least 3B on each thread), each thread can be induced into executing the simdized versions of a parallel loop by ensuring that the trip count always exceeds the SIMD trip count threshold during versioning.

The application of 3B is intended to preserve compile time alignments. Furthermore, the application of 3B ensures each thread will enter a simdizable version of the parallel loop. To generalize this concept, the condition needs to be above the minimal simdizable threshold and be a multiple of the blocking factor. For system imposed, rigid scheduling, since each thread as requested by the OpenMP standard must be used, we are not allowed the flexibility to reduce the number of threads. We use the trip count condition of 3B*the maximum number of threads to be used. For flexible schedule, we have the freedom to adjust the number of threads. Then we do so such that each thread has at least minimal simdizable threshold number of iterations. This is to choose the number of threads judiciously to ensure the simd loops are executed.

In block 360, versioning can be applied to the selected loop based upon the evaluation of the relative alignment condition. In this regard, parallel loops for the selected loop can be generated according to different versions, the versions accounting for whether or not a trip count for the loop is below a minimum threshold set by a trip count condition, or whether only compile time shifts are required to manage alignment, or whether both compile time and runtime shifts are required to manage alignment. As a final step of the process, in block 370 prologue and epilogue splice operations can be added to V2 and V3 of FIG. 4. Specifically, epilogue splice operations are required because of the runtime upper bound The splice operation includes a sequence of machine instructions to splice together bytes of data by loading the bytes of data separately, merging the bytes of data into one vector and storing the memory addressable sequence of data into memory. Prologue splice instructions are needed if misalignments exist in the original loop before modification for parallel execution. Both the prologue and epilogue splice instructions are augmented with dirty bit information to communicate with the software cache and to avoid false sharing conditions, conforming to the share memory model of the SMP API.

By way of example in specific reference to FIG. 4, code snippets representative of a process for SIMD code generation for parallel loops using versioning and scheduling is shown. As shown in FIG. 4, a selected loop 410 in source code can be transformed into a loop modified for parallel execution 420 with unknown upper and lower bounds (unknown lower bound is a result of parallelization), without respect to SIMD. However, in accordance with an embodiment of the present invention, the selected loop 410 alternatively can be transformed into a SIMD versioned loop 430 modified for parallel execution according to trip count and relative alignment. Referring to the SIMD versioned loop 430, different loop versions V1, V2 and V3 can be produced depending upon the evaluation of trip count to trip count condition, and the relative alignment condition. Specifically, V1 addresses a loop with a trip count below the minimal SIMD threshold. The minimal SIMD trip count is established to be three times the blocking factor of the loop. V2 and V3, by comparison, are simdized versions as the SPE supports permute instructions with both compile-time and runtime patterns.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. In a code compilation data processing system, a single instruction multiple data (SIMD) parallel loop code generation method comprising:
   identifying a loop in a representation of source code in a code compilation data processing system;
   selecting a trip count condition responsive to a scheduling policy set for the code compilation data processing system and also responsive to a minimal simdizable threshold;
   determining a trip count and an alignment constraint for the selected loop; and,
   generating a version of a parallel loop in the source code according to the alignment constraint and a comparison of the trip count to the trip count condition.

2. The method of claim 1, further comprising inserting a prologue splicing operation and an epilogue splicing operation before and after a simdized body of a version of the parallel loop to provide dirty bit information in connection with the prologue and epilogue splicing operations.

3. The method of claim 1, wherein selecting a trip count condition comprises selecting a trip count condition based upon a scheduling policy for a target multiprocessor supporting a shared memory Application Programming Interface (API).

4. The method of claim 3, wherein selecting a trip count condition selecting at least a three times a blocking factor (B) of the selected loop as a trip count condition for flexible scheduling policies, and selecting at least 3B times a maximum number of threads permitted for a parallel region as a trip condition for system imposed, rigid scheduling policies.

5. The method of claim 1, wherein generating a version of a parallel loop in the source code according to the alignment constraint and a comparison of the trip count to the trip count condition comprises:
   generating a first version when the trip count for the selected loop is below a minimum SIMD threshold set by the trip count condition and the scheduling policy;
   generating a second version when only compile time shifts are required to manage alignment; and,
   generating a third version when both compile time and runtime shifts are required to manage alignment.

6. A code compilation data processing system comprising:
   a host computing platform supporting an operating system managing a compiler executing in the operating system;
   a shared memory application programming interface (API) supported by the compiler; and,
   single instruction multiple data (SIMD) code generation logic coupled to the compiler and accessing the shared memory API, the logic comprising program code enabled to generate one of three versions of a parallel loop for a selected loop in representation of source code according to a computed alignment constraint and a comparison of a trip count determined for the loop with a specified trip count condition selected responsive to a scheduling policy set for the code compilation data processing system and also responsive to a minimal simdizable threshold.

7. The system of claim 6, wherein the shared memory API comprises at least a splice sequence of instructions communicating dirty bit information to a cache when executed.

8. The system of claim 6, wherein the specified trip count condition is variable responsive to a scheduling policy set for the compiler and also responsive to a minimal simdizable threshold.

9. A computer program product comprising a computer usable storage medium storing computer usable program code for single instruction multiple data (SIMD) parallel loop code generation, the computer program product comprising:
   computer usable program code for identifying a loop in a representation of source code in a code compilation data processing system;
   computer usable program code for selecting a trip count condition responsive to a scheduling policy set for the code compilation data processing system and also responsive to a minimal simdizable threshold;

computer usable program code for determining a trip count and an alignment constraint for the selected loop; and, computer usable program code for generating a version of a parallel loop in the source code according to the alignment constraint and a comparison of the trip count to the trip count condition.

10. The computer program product of claim 9, further comprising computer usable program code for inserting a prologue splicing operation and an epilogue splicing operation before and after a simdized body of a version of the parallel loop to provide dirty bit information in connection with the prologue and epilogue splicing operations.

11. The computer program product of claim 9, wherein the computer usable program code for selecting a trip count condition comprises computer usable program code for selecting a trip count condition based upon a scheduling scheme for a multiprocessor with a shared memory API.

12. The computer program product of claim 11, wherein the computer usable program code for selecting a trip count condition, comprises computer usable program code selecting at least three times a blocking factor (B) of the selected loop as a trip count condition for flexible scheduling policies, and selecting 3B times a maximum number of threads permitted for a parallel region as a trip condition for system imposed, rigid scheduling.

13. The computer program product of claim 9, wherein the computer usable program code for generating a version of a parallel loop in the source code according to the alignment constraint and a comparison of the trip count to the trip count condition comprises:

computer usable program code for generating a first version when the trip count for the selected loop is below a minimum SIMD threshold set by the trip count condition and scheduling policy;

computer usable program code for generating a second version when only compile time shifts are required to manage alignment; and, computer usable program code for generating a third version when both compile time and runtime shifts are required to manage alignment.

* * * * *